No. 698,178.  
Patented Apr. 22, 1902.
J. DABUS.
DRAFT ATTACHMENT FOR DOUBLETREES.
(Application filed Aug. 20, 1901.)
(No Model.)
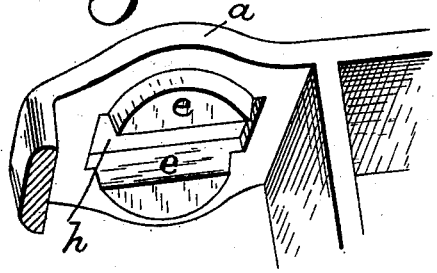
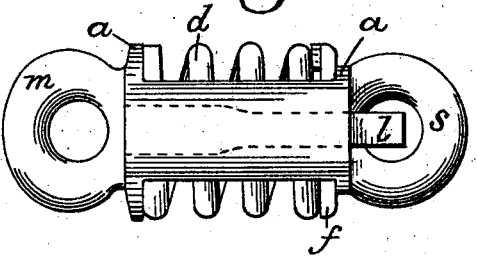
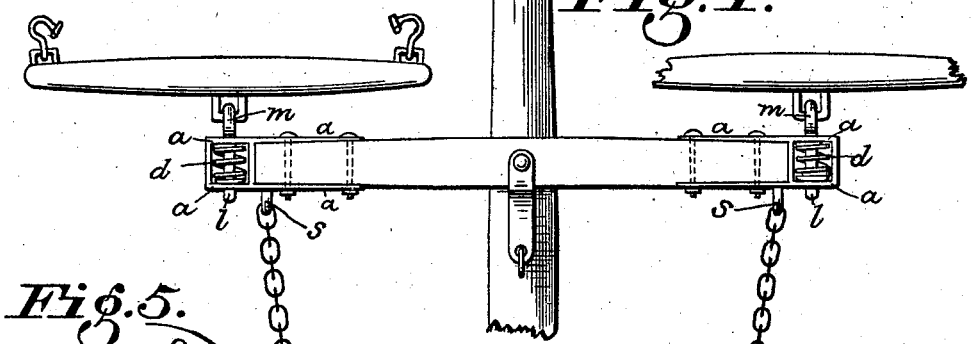
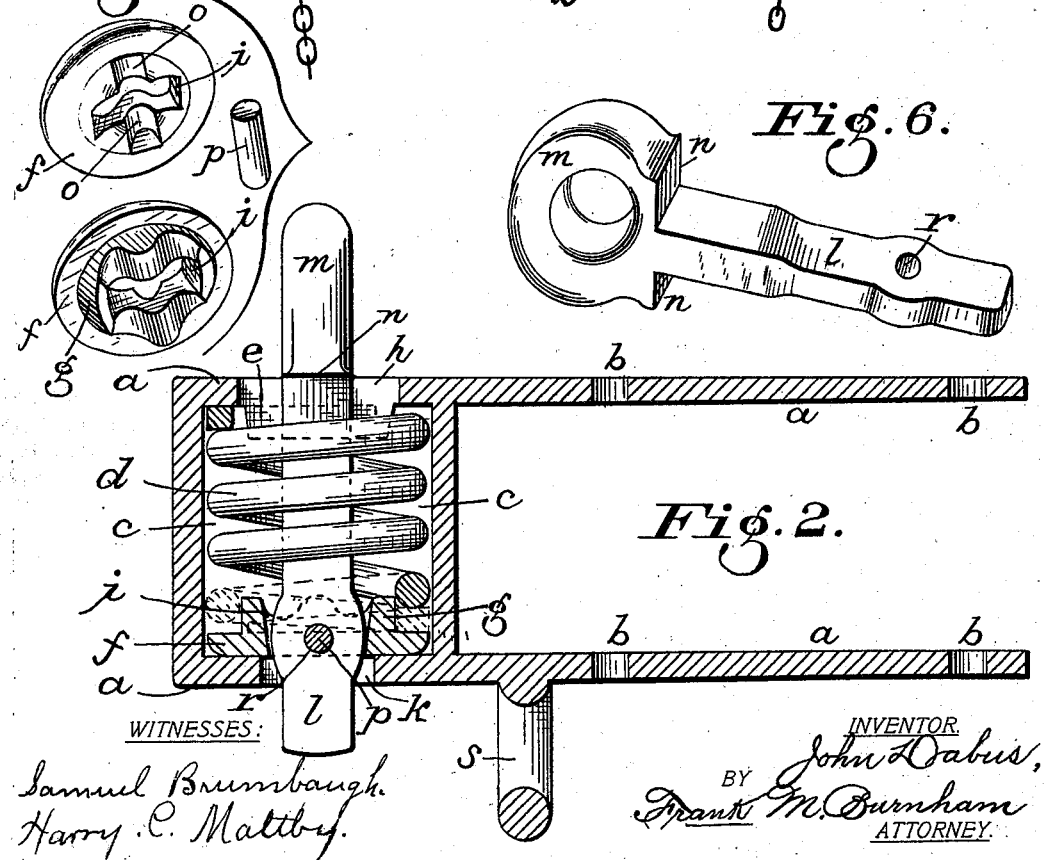
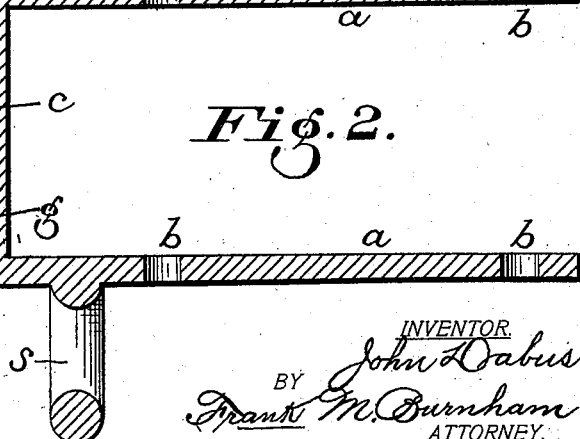
WITNESSES:  
Samuel Brumbaugh.  
Harry C. Maltby.
INVENTOR  
John Dabus,  
BY Frank M. Burnham  
ATTORNEY.
THE NORRIS PETERS CO., PHOTO-LITHO., WASHINGTON, D. C.

UNITED STATES PATENT OFFICE.

JOHN DABUS, OF PIQUA, OHIO.

DRAFT ATTACHMENT FOR DOUBLETREES.

SPECIFICATION forming part of Letters Patent No. 698,178, dated April 22, 1902.

Application filed August 20, 1901. Serial No. 72,637. (No model.)

*To all whom it may concern:*

Be it known that I, JOHN DABUS, a citizen of the United States, residing at Piqua, in the county of Miami and State of Ohio, have invented certain new and useful Improvements in Draft Attachments for Doubletrees; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a draft attachment more especially designed and adapted for the purpose of connecting the singletrees to the doubletree.

The main object or purpose of this invention is in providing a device of simple construction and inexpensive cost of manufacture and one which will effectively relieve and prevent any sudden jar or strain from coming on the horses, especially their shoulders, caused by the wheels of the wagon or any part of the vehicle or agricultural implement striking an obstruction suddenly or in starting quickly with an uneven draft, which with my attachment will be readily equalized and regulated.

My invention consists of certain novel and peculiar features of construction and combination and arrangement of the several parts, as will be more fully described hereinafter and particularly set forth in the subjoined claims, all in accordance with the statutes in such cases made and provided therefor.

In the annexed drawings, forming a part of this specification, and wherein like letters of reference indicate the same parts wherever they occur throughout the several views, Figure 1 is a plan view of a pole having the doubletree and singletrees properly connected by means of my draft attachment, so as to show the practical application of the same. Fig. 2 is a longitudinal horizontal sectional view through one of the entire attachments, showing the spring partially in section and the draw-bar in solid lines and the several parts all in their proper position just before the device is attached to the end of the doubletree and connected to the singletree. Fig. 3 is an end view of the device as shown in Fig. 2, only on a slightly-reduced scale. Fig. 4 is a detail view in perspective of a portion of the front side of the frame broken away, so as to show the flanges which hold the front of the spring in position; also, the long slot located between said flanges which receive the draw-bar and permits of its lateral movement. Fig. 5 is a group of detail views in perspective showing both sides of the circular bearing-plate or washer and the retaining-pin, which passes through the draw-bar and rests in the recesses in said plate or washer; and Fig. 6 is a perspective view of the draw-bar.

In describing my improved "draft attachment for doubletrees" and referring to the different parts thereof in detail, as shown throughout the drawings by means of the letters of reference as aforesaid, $a$ refers to the sides of the frame which extend inwardly a sufficient distance to form the "irons" (see Figs. 1 and 2) and which fit or bear against each edge of the ends of the doubletree and are connected or fastened thereto, preferably by bolts, which pass through the eyes $b$ and the doubletree ends in the usual manner. Said frame is formed at its outer end in an apartment $c$, in which rests the coil-spring $d$, constructed of suitable material, so as to have the proper power of resiliency, the forward or front end of said spring being supported in position by two flanges or lugs $e$, (see Figs. 2 and 4,) which project from the front side portion $a$ of the frame into apartment $c$ and fit inside said spring, while the rear end of said spring rests and impinges firmly against a circular bearing-plate or washer $f$, formed with a raised portion or collar $g$, adapted to fit inside of and support the rear end of said spring. Slot $h$, located in the front side portion $a$ of the frame between said flanges or lugs, is much longer than slot $i$ in said circular bearing-plate or washer, and the slot $k$, located in rear side portion $a$ of the frame, for the purpose of permitting any lateral movement of draw-bar $l$ when it rests in operative position in said slots, caused by the horses not pulling even or, in other words, any uneven draft is thus equalized. An eye or ring $m$ is formed at the forward end of the draw-bar $l$, by which it is linked or connected to the singletree, (see Fig. 1,) which is provided with shoulders or bearings n (see Fig. 6) for holding it against the side portion of the frame. Circular bearing-plate or washer f is also provided with a cavity or recess o, suitably formed for the reception of a short pin p, which passes through small opening r in said draw-bar, and thus retains it in position. It will be noted that the rear end of the draw-bar l is extended sufficiently long so as to project beyond the frame when in normal condition, as shown in Figs. 2 and 3, for the purpose that when said spring is compressed by reason of the draft this end will always be proportionately long enough to rest in the frame and support said spring and prevent it from sagging or dropping out of the frame, and it will be further noted that said bar is considerably wider around small opening r for the purpose of not alone strengthening the bar at this point, but also to facilitate any lateral play of the bar in slot i of the washer, which is accordingly made on a slight incline, as shown in Fig. 2. An eye or ring s projects from the rear side portion or "iron" a, to which the stay chain or strap is connected or attached.

As shown in Fig. 3, it will be observed that the front side portion a of the frame just in line with apartment c is made much wider or higher at this point than the rear side portion just opposite. This is done for the purpose of accommodating the flanges e and leave sufficient bearing-surface for the spring.

I am well aware that springs have been employed in various forms for draft attachments, and I therefore do not claim the use of a spring broadly; but What I do claim is—

1. In an improved draft attachment for connecting the singletrees to the doubletree, the frame having an open apartment provided with flanges, and formed at its forward and rear ends with a slot; the draw-bar provided with an eye or ring, and formed with the bearing-shoulders; the coil-spring adapted to rest around said draw-bar, and in said open apartment; the circular bearing-plate or washer, formed with a raised portion or collar adapted to fit inside of and support said spring, and also formed with a cavity or recess; and a retaining-pin; all substantially as and for the purpose described.

2. The combination in an improved draft attachment for connecting the singletrees to the doubletree; of the rectangular frame having straps for "ironing" the ends of the doubletree, the rear one being provided with the stay-chain eye, an open apartment formed by said frame and provided with flanges and formed at its forward and rear ends with a slot, the forward slot being much larger than rear slot, so as to permit of any lateral play; the draw-bar adapted to rest in the slots in said frame, and formed with the eye or ring having shoulders adapted to bear against said frame, also the swelled portion provided with a pin-opening; the coil-spring adapted to bear against said flanges and rest around said draw-bar in said open apartment; the circular bearing-plate or washer having the inclined slot for the draw-bar, and formed with the raised portion or collar adapted to fit in said spring, and also provided with a cavity or recess; and the retaining-pin adapted to pass through the opening in said draw-bar and rest in said cavity or recess in said collar; all substantially as and for the purpose described.

In testimony whereof I have affixed my signature in presence of two witnesses.

JOHN DABUS.

Witnesses:
ELLA RICHARDSON,
ALLEN C. MCDONALD.